United States Patent
Gao et al.

(10) Patent No.: US 12,024,664 B2
(45) Date of Patent: *Jul. 2, 2024

(54) LIQUID CRYSTAL COMPOSITION WITH GOOD FREQUENCY DEPENDENCE AND LIQUID CRYSTAL DISPLAY ELEMENT

(71) Applicant: Shijiazhuang Chengzhi Yonghua Display Material Co., ltd., Hebei (CN)

(72) Inventors: Hongru Gao, Hebei (CN); Wenxiao Xing, Hebei (CN); Meida Pan, Hebei (CN); Qing Cui, Hebei (CN); Gang Wen, Hebei (CN); Jikai Li, Hebei (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,390

(22) Filed: Dec. 12, 2022

(65) Prior Publication Data

US 2023/0183572 A1 Jun. 15, 2023

(30) Foreign Application Priority Data

Dec. 10, 2021 (CN) .......................... 202111508980.2
Oct. 31, 2022 (CN) .......................... 202211366245.7

(51) Int. Cl.
*G02F 1/1333* (2006.01)
*C09K 19/12* (2006.01)
*C09K 19/34* (2006.01)

(52) U.S. Cl.
CPC .......... *C09K 19/3402* (2013.01); *C09K 19/12* (2013.01); *C09K 19/3491* (2013.01); *C09K 2019/122* (2013.01); *C09K 2019/123* (2013.01); *C09K 2019/3416* (2013.01); *C09K 2019/3425* (2013.01)

(58) Field of Classification Search
CPC .............. C09K 19/3402; C09K 19/12; C09K 19/3491; C09K 19/3098; C09K 19/3066; C09K 2019/122; C09K 2019/123; C09K 2019/3416; C09K 2019/3425; C09K 2019/3004; C09K 2019/3009; C09K 2019/301; C09K 2019/3016; C09K 2019/3021; C09K 2019/3027; C09K 2019/3037; C09K 2019/3408; G02F 1/1333

See application file for complete search history.

(56) References Cited

U.S. PATENT DOCUMENTS

| | | | |
|---|---|---|---|
| 2018/0320071 A1* | 11/2018 | Meng | C09K 19/12 |
| 2019/0375986 A1* | 12/2019 | Xing | C09K 19/12 |
| 2023/0183572 A1* | 6/2023 | Gao | C09K 19/3491 |
| | | | 252/299.61 |
| 2023/0183573 A1* | 6/2023 | Zhang | C09K 19/3098 |
| | | | 252/299.61 |

FOREIGN PATENT DOCUMENTS

CN 107674687 A * 2/2018 ............. C09K 19/44

* cited by examiner

*Primary Examiner* — Geraldina Visconti
(74) *Attorney, Agent, or Firm* — MUNCY, GEISSLER, OLDS & LOWE, PC

(57) ABSTRACT

The present invention belongs to the technical field of liquid crystal materials, and in particular relates to a liquid crystal composition with good frequency dependence and a liquid crystal display element or liquid crystal display containing the liquid crystal composition. The liquid crystal composition of the present invention comprises a compound represented by Formula I, a compound represented by Formula II and a compound represented by Formula III, wherein the mass percentage content of the compound represented by Formula I is not less than 30%. The liquid crystal composition provided by the present invention has an appropriate optical anisotropy, an appropriate dielectric anisotropy, especially a relatively low rotational viscosity, a good low-temperature mutual solubility and a good reliability, especially good frequency dependence.

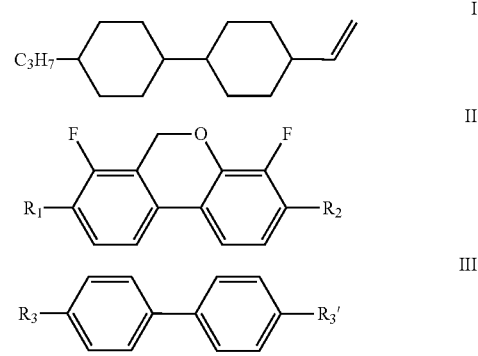

6 Claims, No Drawings

LIQUID CRYSTAL COMPOSITION WITH GOOD FREQUENCY DEPENDENCE AND LIQUID CRYSTAL DISPLAY ELEMENT

TECHNICAL FIELD

The present invention relates to the technical field of liquid crystal materials. In more particular, the present invention relates to a liquid crystal composition with good frequency dependence and a liquid crystal display element.

BACKGROUND ART

With the continuous development of display technologies, thin film transistor liquid crystal display (TFT-LCD) quickly occupies the leading position in the display industry and has been widely used in many fields due of a range of its advantages, such as a high resolution, rich colors, a high contrast ratio, a high brightness, a large viewing angle, a fast response speed, and easy realization of large-area display. In recent years, despite challenges from emerging display technologies such as Organic Light-Emitting Diode (OLED), Quantum Dot Light-Emitting Diode (QLED) and Micro Light-Emitting Diode (Micro-LED), TFT-LCD display technology, thanks to its excellent product performance, complete material system, mature process procedures and obvious price advantages, still has absolute leading edge in many aspects such as ultra-high resolution, large size and touch integration. When evaluating the display effect of a TFT-LCD panel, parameters such as resolution, transmittance, contrast ratio, response time and color gamut are usually considered, while transmittance is directly related to the display effect of the panel and is also a key indicator that can reflect the overall technical level of a panel manufacturer.

A liquid crystal is composed of a variety of liquid crystal monomers, and the properties of liquid crystal materials also influence and restrict each other. For example, the dielectric anisotropy of the liquid crystal materials directly affects the display properties of a liquid crystal device, including threshold voltage, response time, duty cycle, etc. The dielectric anisotropy of the liquid crystal materials mainly depends on the degree of polarization of liquid crystal molecules, which is related to the contribution of factors such as the shape of liquid crystal molecules, the position of polar groups, the permanent dipole moment, the p electron system and the central group, and is also affected by physical factors such as the external environmental temperature and the magnitude of the applied pressure. In addition, the change of the frequency of the applied voltage can change the degree of polarization of liquid crystal molecules, which makes the dielectric anisotropy of the liquid crystal vary. Furthermore, dielectric anisotropy usually has frequency dependence at low temperatures. At a low temperature, when the driving frequency becomes higher, the movement of liquid crystal molecules cannot follow the change of the frequency of the voltage, resulting in poor display. Therefore, the smaller the change of the voltage vs. frequency on the liquid crystal composition, the better the frequency dependence of the liquid crystal composition, and thus the poor display can be solved.

An excellent liquid crystal composition can also bring remarkable display effects on a device, that is, it can realize a fast response time, a fixed threshold voltage, an appropriate transmittance and contrast ratio and other properties, and excellent change rate at high and low temperatures and excellent frequency dependence can in turn solve the problem of transmittance variation when the display is switched between different frequencies.

SUMMARY OF THE INVENTION

In order to solve one or more of the technical defects mentioned above, the present invention provides a technical solution, which has an appropriate optical anisotropy, an appropriate dielectric anisotropy, especially a relatively low rotational viscosity, a good low-temperature mutual solubility, a good reliability and surprisingly good frequency dependence.

In order to achieve the above beneficial technical effects, the present invention provides a liquid crystal composition, the liquid crystal composition comprising a compound represented by Formula I, wherein the mass percentage content of the compound represented by Formula I in the liquid crystal composition is not less than 30%; and the liquid crystal composition further comprises one or more compounds represented by Formula II and one or more compounds represented by Formula III

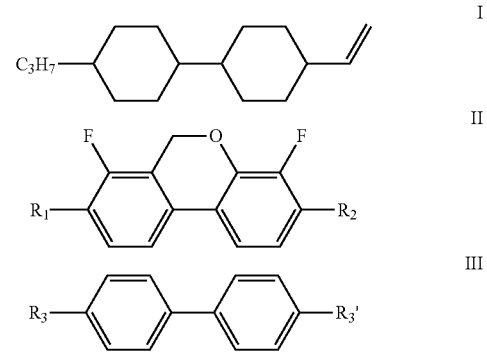

wherein in Formula II,
$R_1$ and $R_2$ each independently represent an alkoxy with a carbon atom number of 1-10 or an alkenoxy with a carbon atom number of 2-10; and when $R_1$ and $R_2$ each independently represent an alkoxy with a carbon atom number of 2-10 or an alkenoxy with a carbon atom number of 2-10, any one of the hydrogen atoms thereof can be replaced by F.
$R_3$ represents an alkyl with a carbon atom number of 1-10; and $R_3'$ represents an alkenyl with a carbon atom number of 2-10.

A second object of the present invention is to provide a liquid crystal display element/display comprising the above-mentioned liquid crystal composition. The liquid crystal display element/display mainly has IPS, FFS or VA display mode, especially FFS display mode.

Effects of the Invention

The technical solution provided by the present invention has an appropriate optical anisotropy, an appropriate dielectric anisotropy, especially a relatively low rotational viscosity, a good low-temperature mutual solubility, a good frequency dependence and a good reliability. The liquid crystal composition of the present invention is mainly applied to FFS display mode and to large-, medium- and small-sized liquid crystal displays, and has a wider range of application fields, such as TV, MB, vehicles, PID and medical devices.

DETAILED DESCRIPTION OF EMBODIMENTS

The present invention provides a liquid crystal composition with good frequency dependence, the liquid crystal composition comprising a compound represented by Formula I, wherein the mass percentage content of the compound represented by Formula I in the liquid crystal composition is not less than 30%; and the liquid crystal composition further comprises one or more compounds represented by Formula II and one or more compounds represented by Formula III

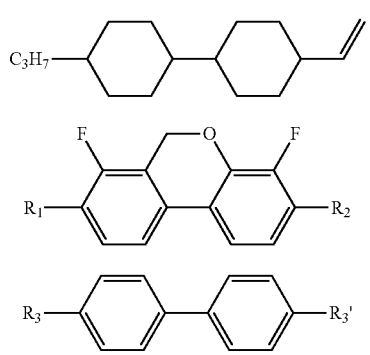

wherein in Formula II, $R_1$ and $R_2$ each independently represent an alkoxy with a carbon atom number of 1-10 or an alkenoxy with a carbon atom number of 2-10; and when $R_1$ and $R_2$ each independently represent an alkoxy with a carbon atom number of 2-10 or an alkenoxy with a carbon atom number of 2-10, any one of the hydrogen atoms thereof can be replaced by F; and $R_3$ represents an alkyl with a carbon atom number of 1-10; and $R_3'$ represents an alkenyl with a carbon atom number of 2-10.

As for the liquid crystal composition of the present invention, preferably, the compound represented by Formula II in the above-mentioned liquid crystal composition is selected from the group consisting of compounds represented by Formulas II-A, II-B, II-C, II-D, II-E, II-F, II-G, II-H, and II-I:

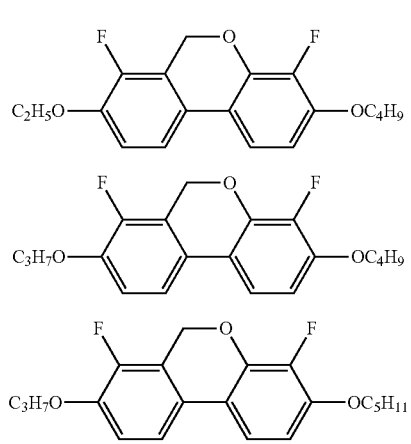

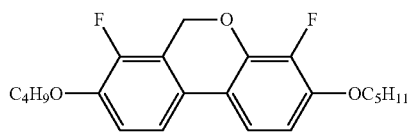

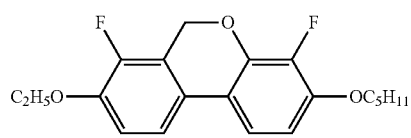

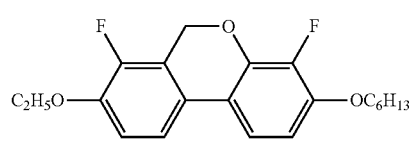

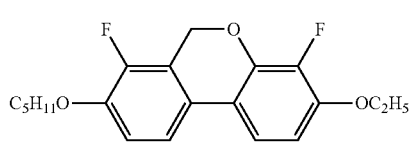

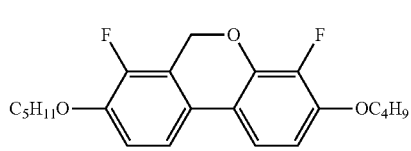

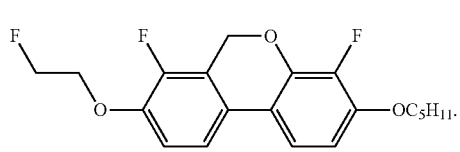

As for the liquid crystal composition of the present invention, preferably, the mass content of the above-mentioned compound represented by Formula II in the liquid crystal composition is 3-15%.

As for the liquid crystal composition of the present invention, preferably, the compound represented by Formula III in the above-mentioned liquid crystal composition is selected from the group consisting of compounds represented by Formulas III-A, III-B, III-E, and III-F:

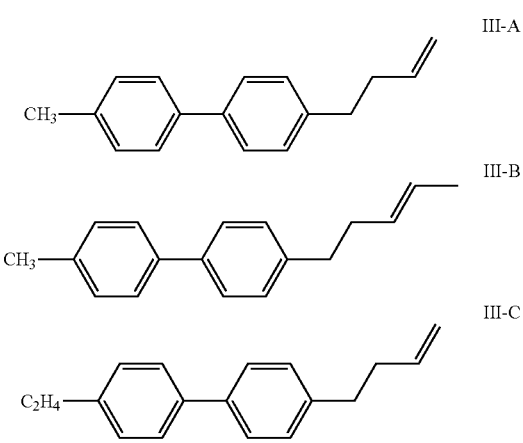

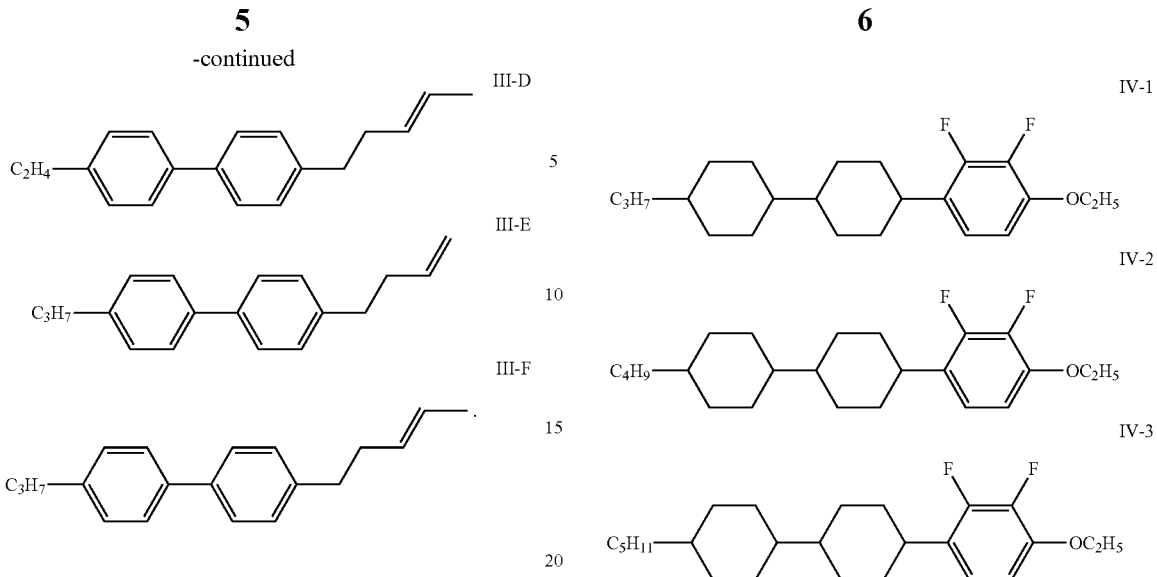

As for the liquid crystal composition of the present invention, further preferably, the above-mentioned compound represented by Formula III is selected from compounds represented by Formula III-A and/or IIIB, and the mass content thereof in the liquid crystal composition is 2-10%, still further preferably 5-10%.

The liquid crystal composition of the present invention preferably further comprises one or more compounds represented by Formula IV:

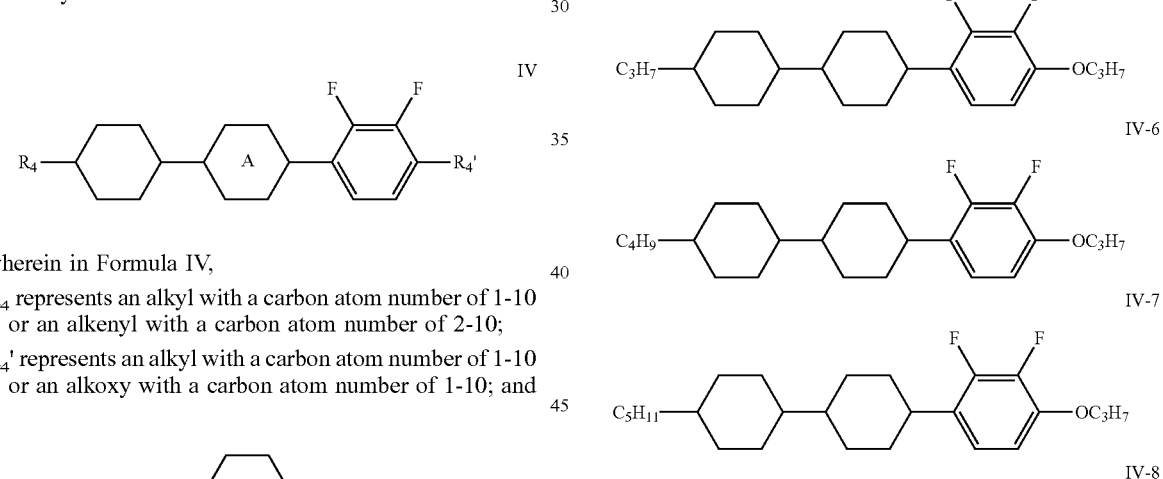

wherein in Formula IV, $R_4$ represents an alkyl with a carbon atom number of 1-10 or an alkenyl with a carbon atom number of 2-10;

$R_4'$ represents an alkyl with a carbon atom number of 1-10 or an alkoxy with a carbon atom number of 1-10; and

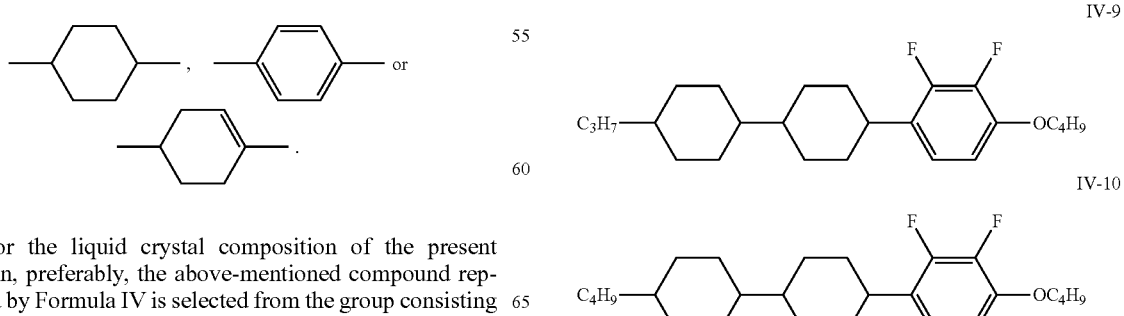

represents

As for the liquid crystal composition of the present invention, preferably, the above-mentioned compound represented by Formula IV is selected from the group consisting of compounds represented by the following Formulas IV-1 to IV-56:

IV-11
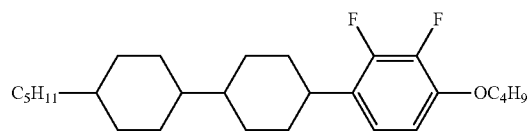
IV-12
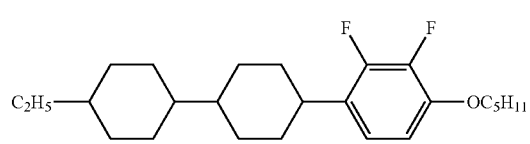
IV-13
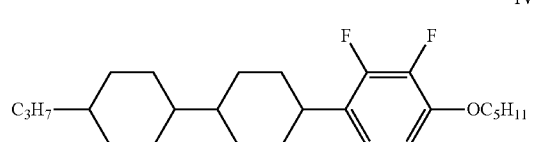
IV-14
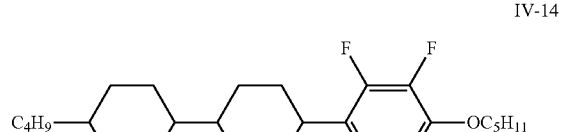
IV-15
IV-16
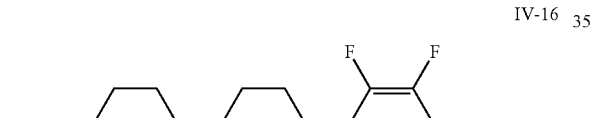
IV-17
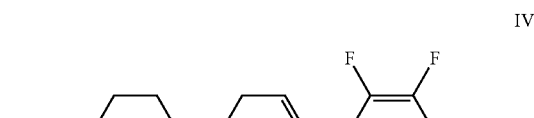
IV-18
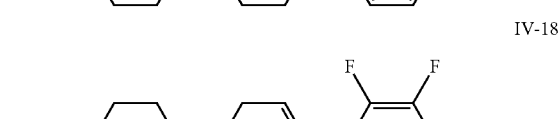
IV-19
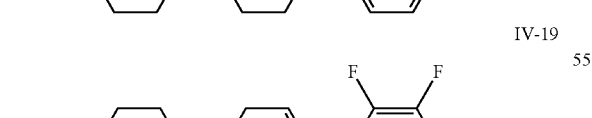
IV-20
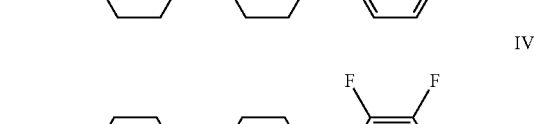
IV-21
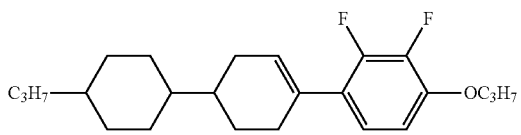
IV-22
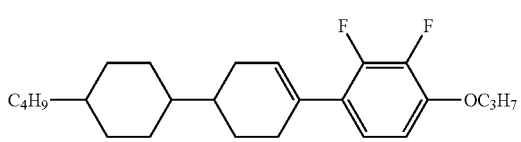
IV-23
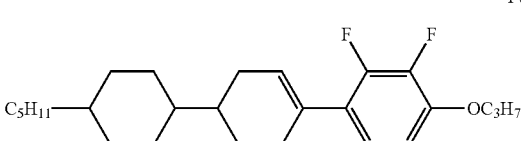
IV-24
IV-25
IV-26
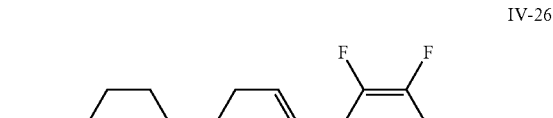
IV-27
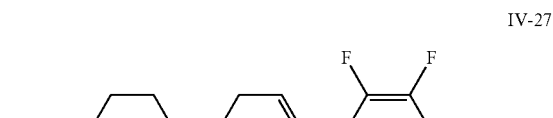
IV-28
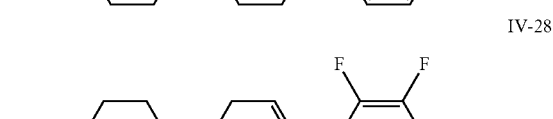
IV-29
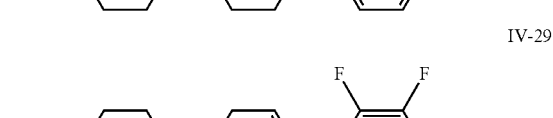
IV-30
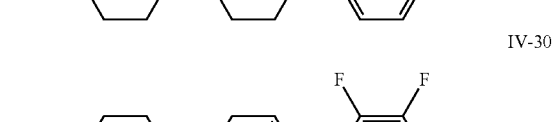

IV-31
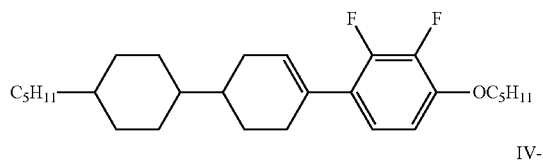
IV-32
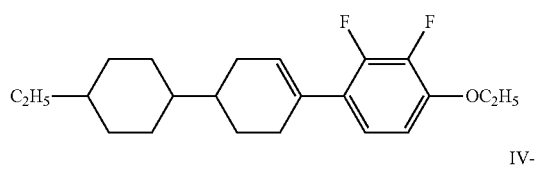
IV-33
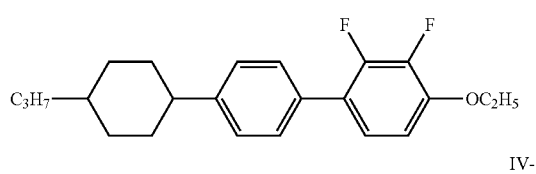
IV-34
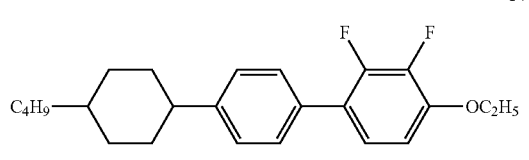
IV-35
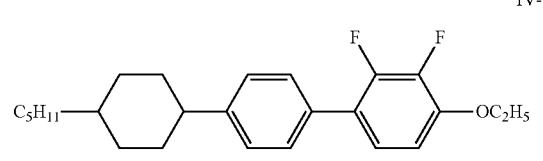
IV-36
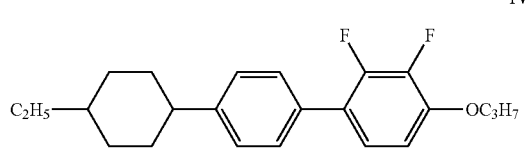
IV-37
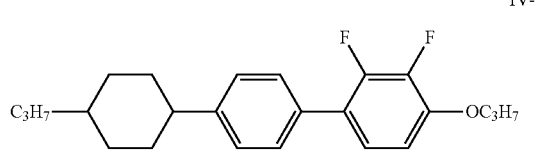
IV-38
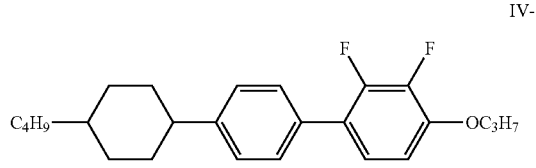
IV-39
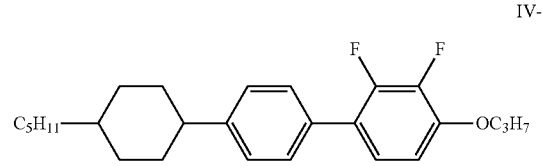
IV-40
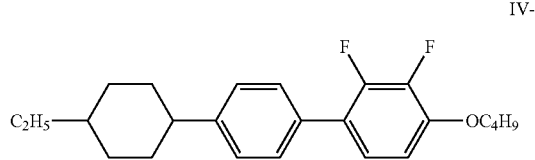
IV-41
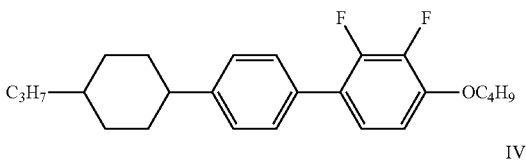
IV-42
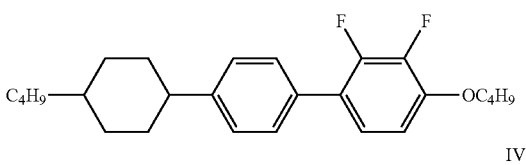
IV-43
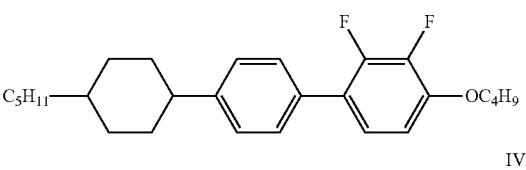
IV-44
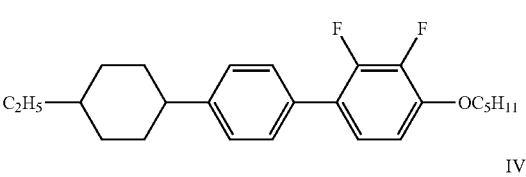
IV-45
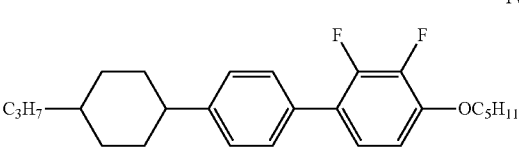
IV-46
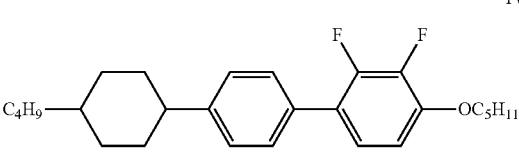
IV-47
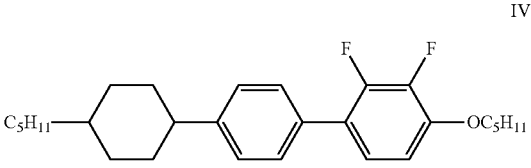
IV-48
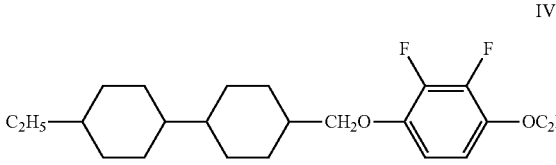
IV-49
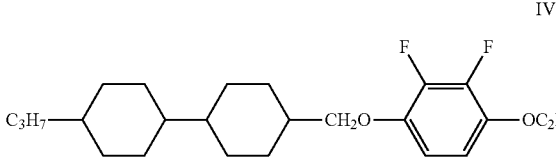
IV-50
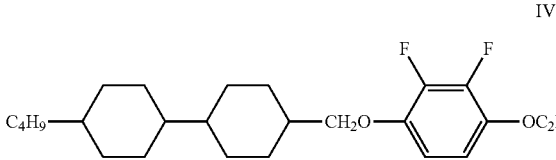

-continued

IV-51
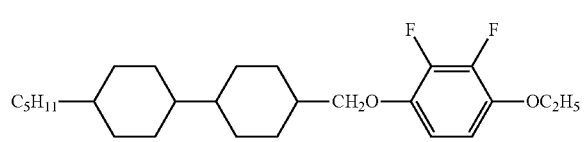

IV-52
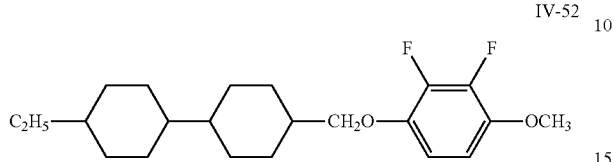

IV-53
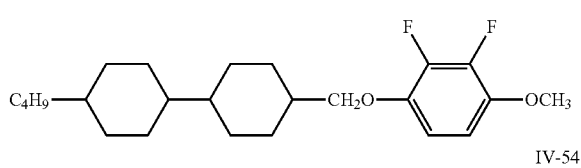

IV-54
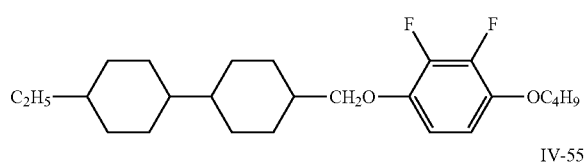

IV-55
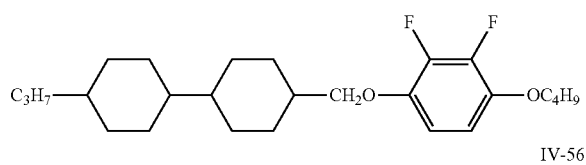

IV-56
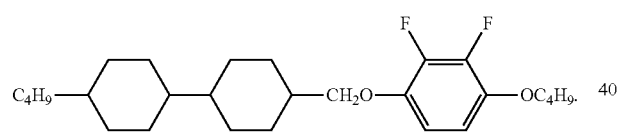

As for the liquid crystal composition of the present invention, further preferably, the above-mentioned liquid crystal composition comprises at least three compounds represented by Formula IV.

As for the liquid crystal composition of the present invention, preferably, the above-mentioned liquid crystal composition comprises one or more compounds represented by Formula V:

V
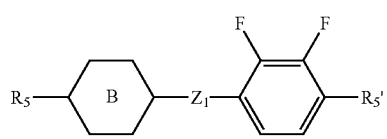

wherein in Formula V, $R_5$ represents an alkyl with a carbon atom number of 1-10 or an alkenyl with a carbon atom number of 2-10;

$R_5'$ represents an alkyl with a carbon atom number of 1-10 or an alkoxy with a carbon atom number of 1-10; and B represents

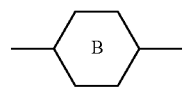

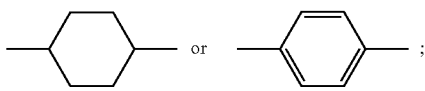

and $Z_1$ represents a single bond, —$CH_2O$— or —$CH_2CH_2$—.

As for the liquid crystal composition of the present invention, further preferably, the above-mentioned compound represented by Formula V is selected from the group consisting of compounds represented by the following Formulas V-1 to V-32:

V-1
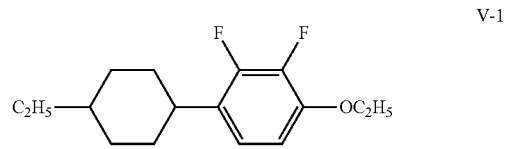

V-2
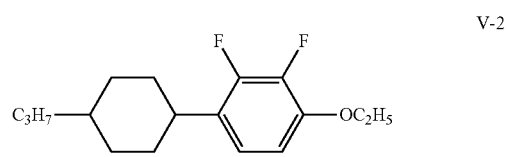

V-3
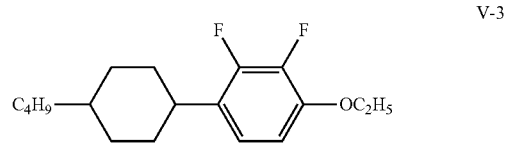

V-4
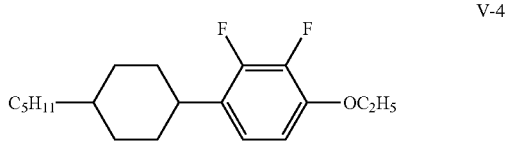

V-5
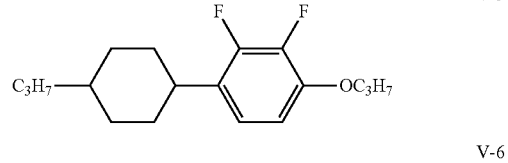

V-6
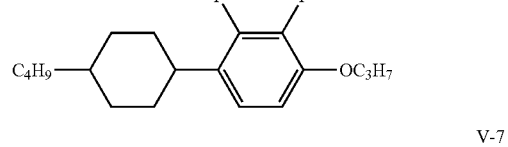

V-7
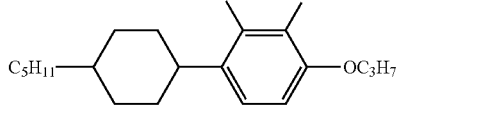

-continued
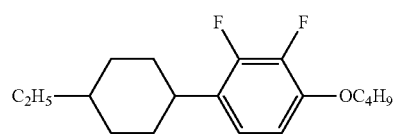 V-8
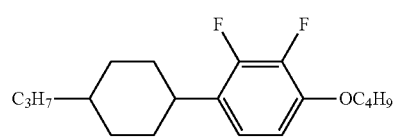 V-9
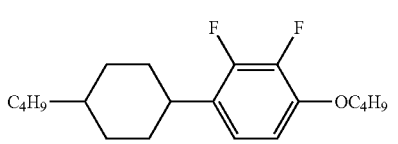 V-10
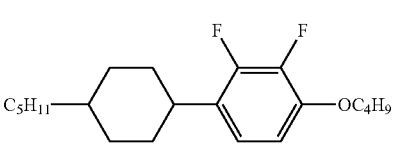 V-11
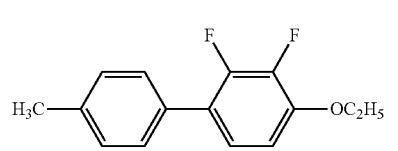 V-12
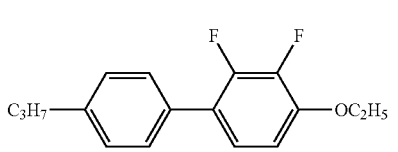 V-13
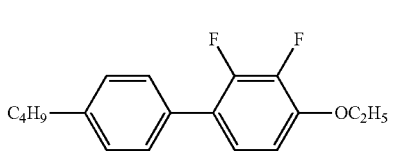 V-14
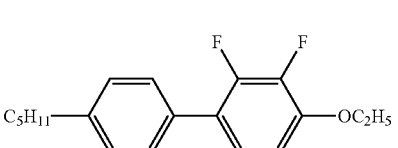 V-15
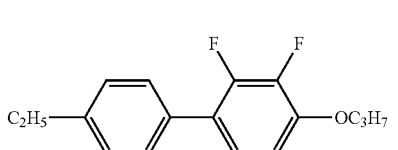 V-16
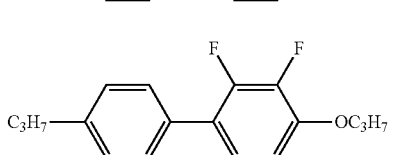 V-17
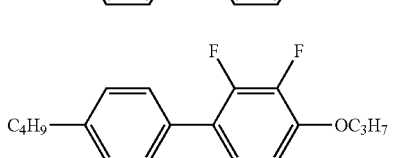 V-18
-continued
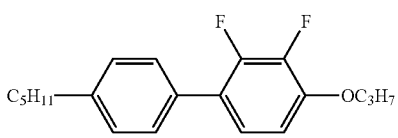 V-19
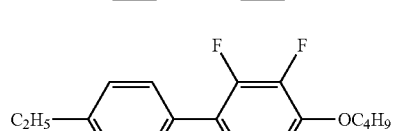 V-20
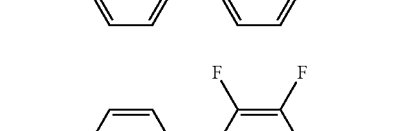 V-21
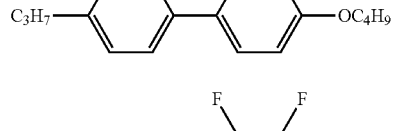 V-22
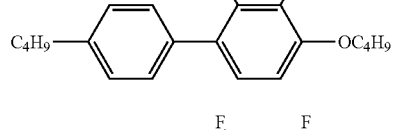 V-23
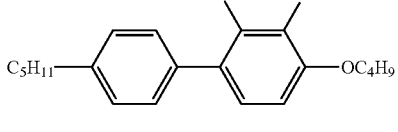 V-24
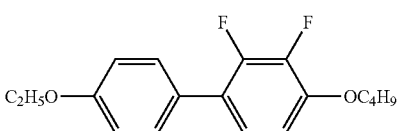 V-25
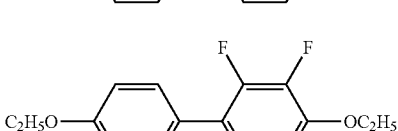 V-26
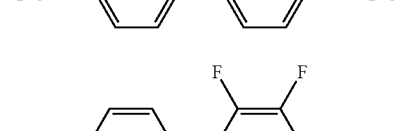 V-27
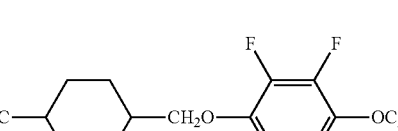 V-28
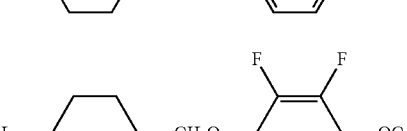 V-29
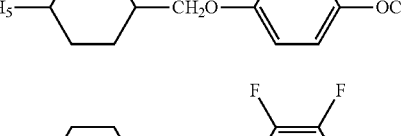

-continued

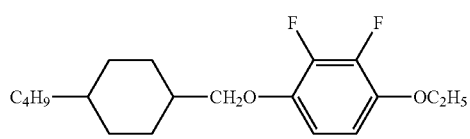
V-30

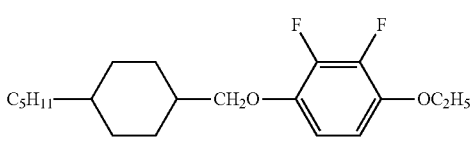
V-31

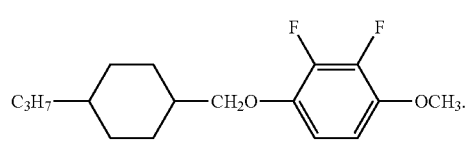
V-32

As for the liquid crystal composition of the present invention, preferably, the above-mentioned liquid crystal composition further comprises one or more compounds represented by Formula VI other than the compound represented by Formula I

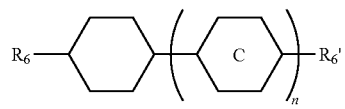
VI wherein in Formula VI,
$R_6$ and $R_6'$ each independently represent an alkyl with a carbon atom number of 1-10, an alkoxy with a carbon atom number of 1-10 or an alkenyl with a carbon atom number of 2-10;

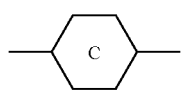

represents

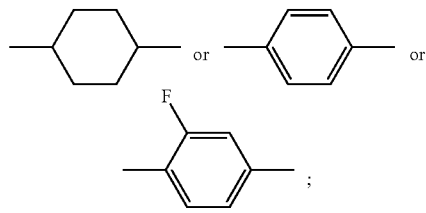

and
n represents 1 or 2 or 3; and when n represents 2 or 3, two or three

may be the same or different.

As for the liquid crystal composition of the present invention, preferably, the above-mentioned compound represented by Formula VI is selected from the group consisting of compounds represented by the following Formulas VI-1 to VI-36:

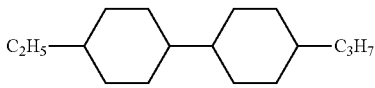
VI-1

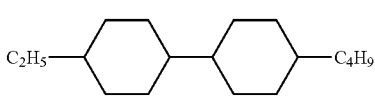
VI-2

VI-3

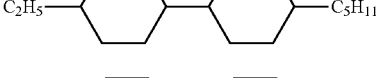
VI-4

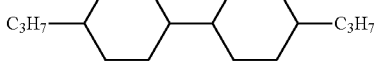
VI-5

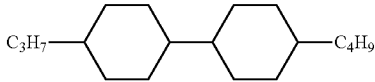
VI-6

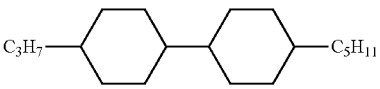
VI-7

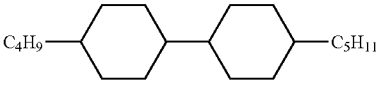
VI-8

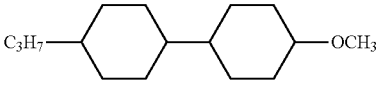
VI-9

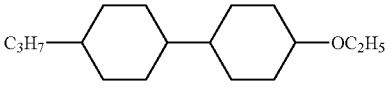
VI-10

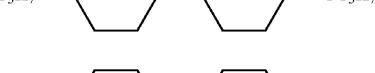
VI-11

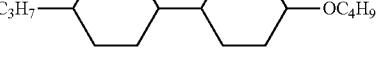
VI-12

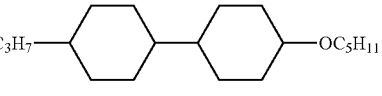
VI-13

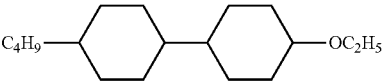
VI-14

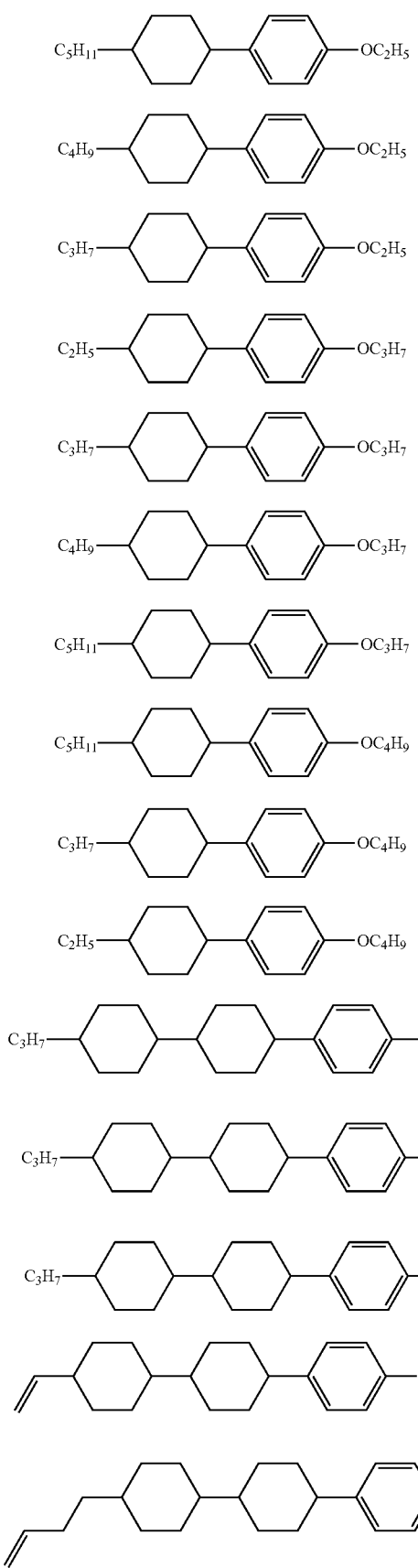

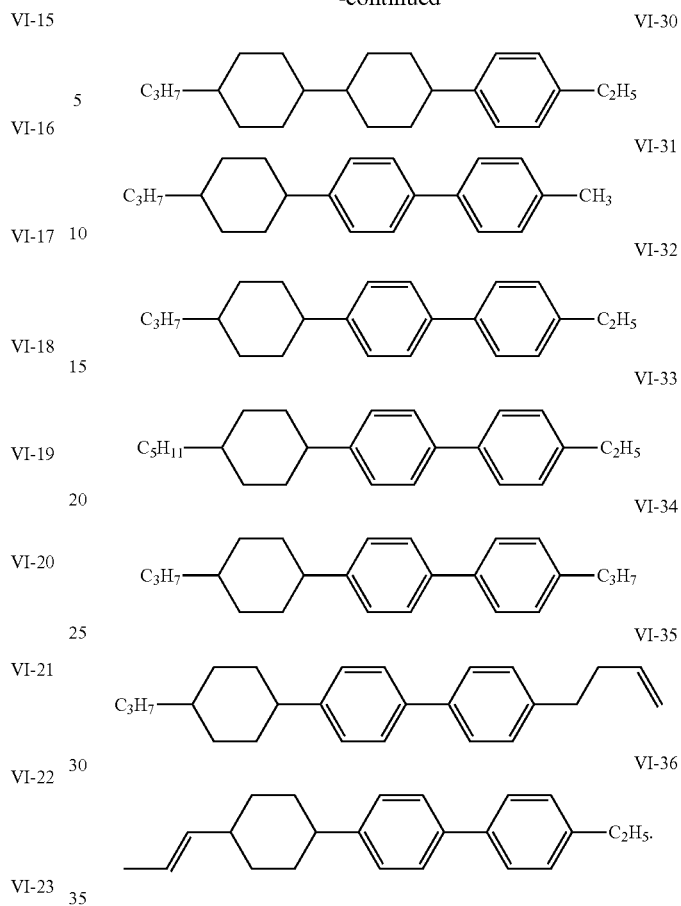

As for the liquid crystal composition of the present invention, preferably, the above-mentioned liquid crystal composition further comprises one or more compounds represented by Formula VII and/or compounds represented by Formula VIII:

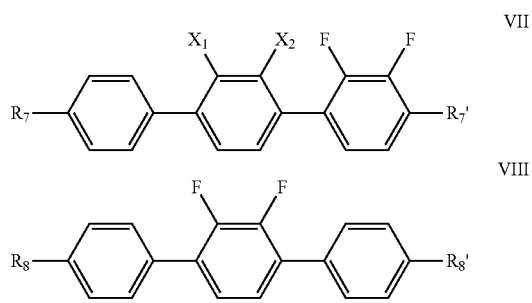

wherein

R$_7$, R$_7$', R$_8$ and R$_8$' each independently represent an alkyl with a carbon atom number of 1-10 and an alkoxy with a carbon atom number of 1-10; and X$_1$ and X$_2$ each independently represent H or F.

As for the liquid crystal composition of the present invention, preferably, the above-mentioned compound represented by Formula VII is selected from the group consisting of compounds represented by the following Formulas VII-1 to VII-28:

VII-1
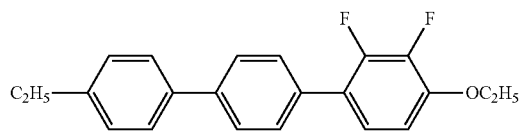
VII-2
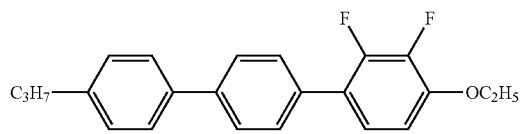
VII-3
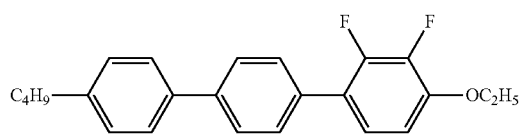
VII-4
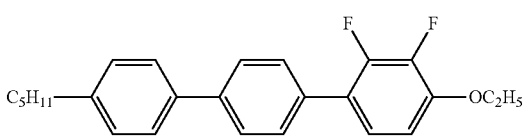
VII-5
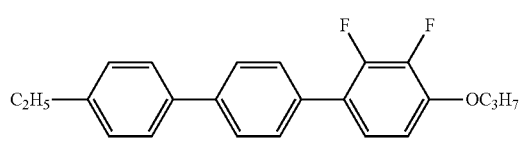
VII-6
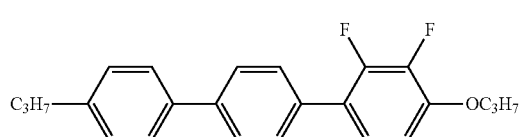
VII-7
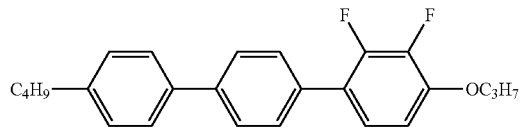
VII-8
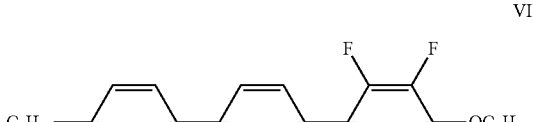
VII-9
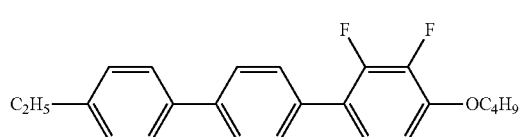
VII-10
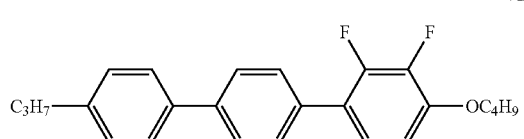
VII-11
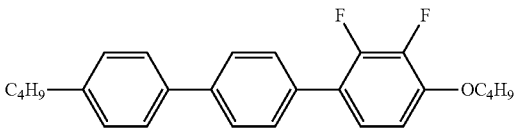
VII-12
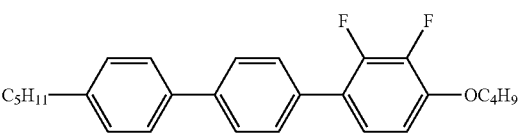
VII-13
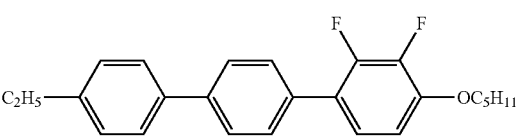
VII-14
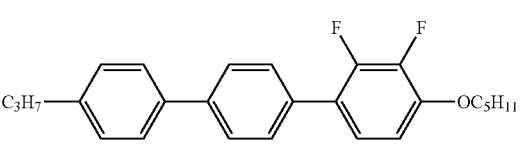
VII-15
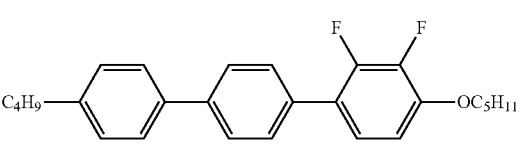
VII-16
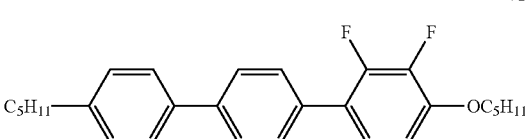
VII-17
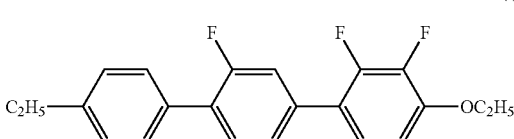
VII-18
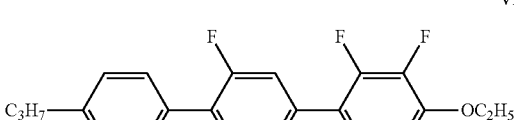
VII-19
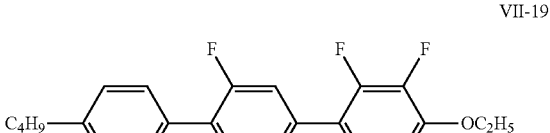
VII-20
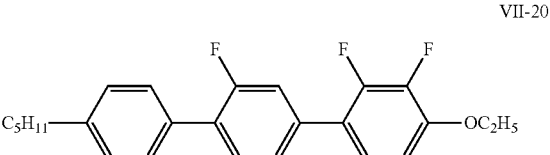

-continued

VII-21
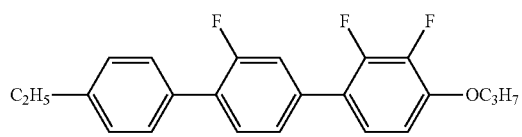

VII-22
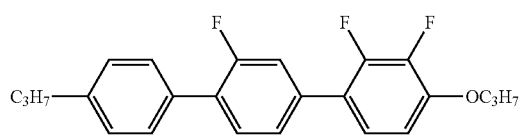

VII-23
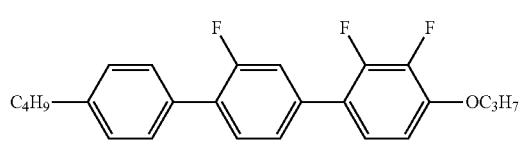

VII-24
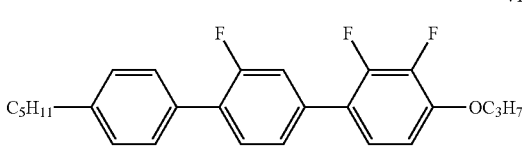

VII-25
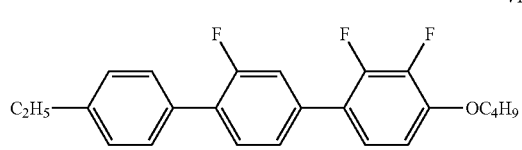

VII-26
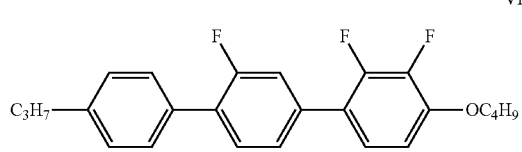

VII-27
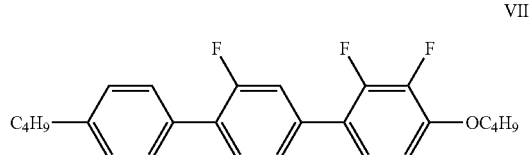

VII-28
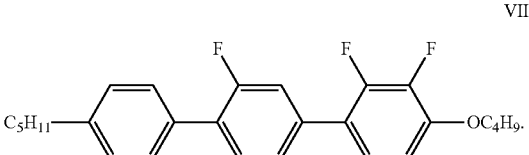

As for the liquid crystal composition of the present invention, preferably, the above-mentioned compound represented by Formula VIII is selected from the group consisting of compounds represented by the following Formulas VIII-1 to VIII-3:

VIII-1
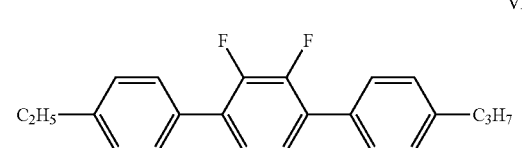

-continued

VIII-2
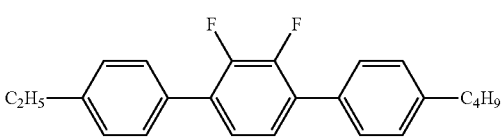

VIII-3
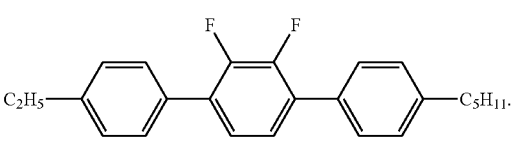

As for the liquid crystal composition of the present invention, further preferably, the liquid crystal composition comprises 3-5% by mass of the compound represented by Formula VIII-1.

As for the liquid crystal composition of the present invention, preferably, the above-mentioned liquid crystal composition comprises one or more compounds represented by Formula IX:

IX
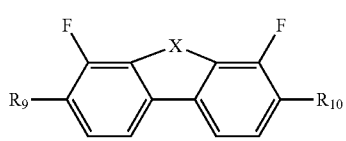

wherein in Formula IX, $R_9$ represents an alkoxy with a carbon atom number of 1-10 and an alkyl with a carbon atom number of 1-10, or

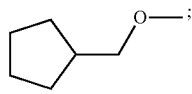

$R_{10}$ represents an alkoxy with a carbon atom number of 1-10 or an alkyl with a carbon atom number of 1-10; and X represents O or S.

As for the liquid crystal composition of the present invention, preferably, the above-mentioned compound represented by Formula IX is selected from the group consisting of compounds represented by the following Formulas IX-1 to IX-12:

IX-1
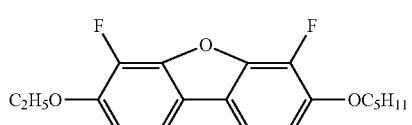

IX-2
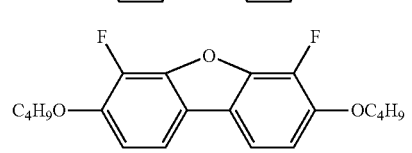

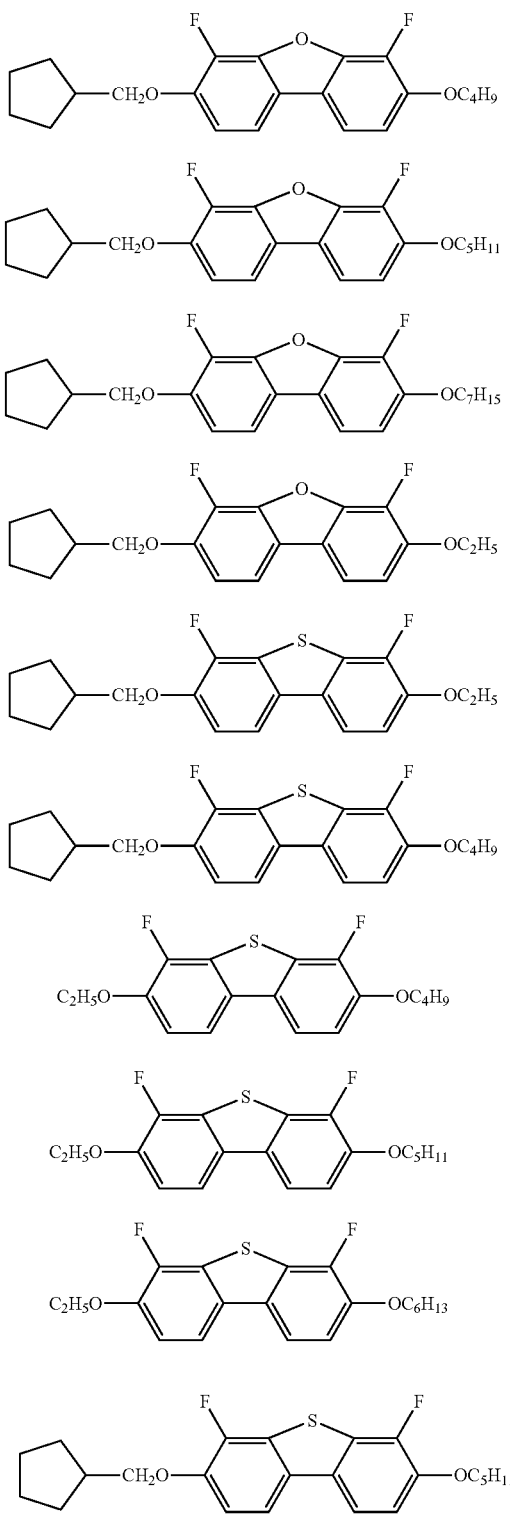

As for the liquid crystal composition of the present invention, preferably, various functional dopants may also be added to the above-mentioned liquid crystal compound.

As for the liquid crystal composition of the present invention, preferably, the above-mentioned dopants are mainly antioxidants, light stabilizers, etc.

As for the liquid crystal composition of the present invention, preferably, the mass percentage content of the above-mentioned dopants is preferably between 0.01% and 1%.

As for the liquid crystal composition of the present invention, preferably, the above-mentioned antioxidant is selected from one or more of compounds represented by Formulas T-1 to T-4:

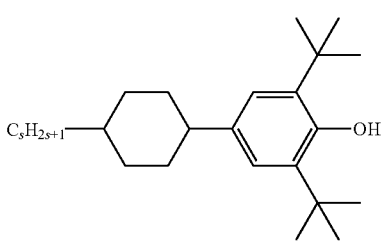

T-1

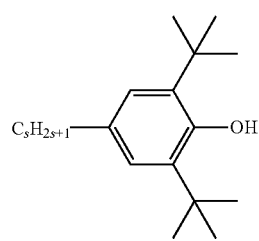

T-2

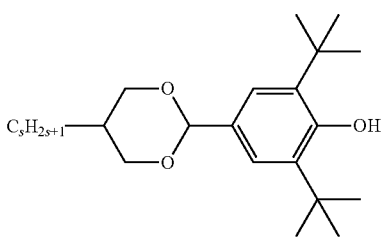

T-3

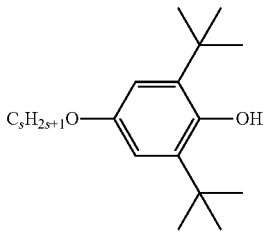

T-4 wherein S represents an integer of 1-10.

As for the liquid crystal composition of the present invention, preferably, the compounds represented by Formulas T-1 to T-4 as the above-mentioned antioxidant are selected from the group consisting of compounds represented by Formulas T-1-1 to T-4-6:

T-1-1
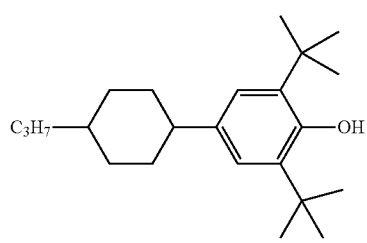
T-1-2
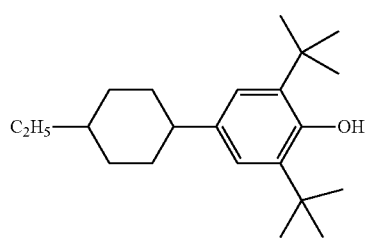
T-1-3
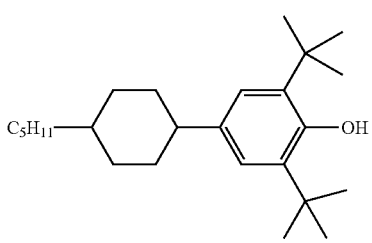
T-1-4
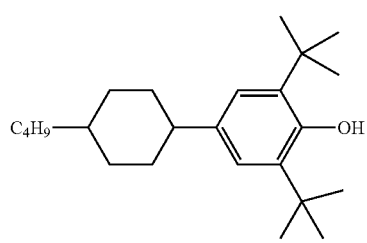
T-1-5
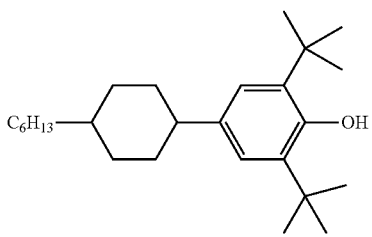
T-1-6
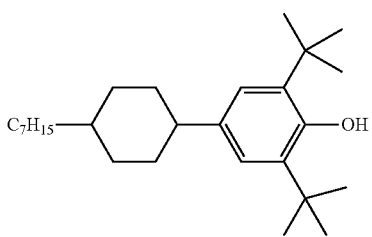
-continued
T-2-1
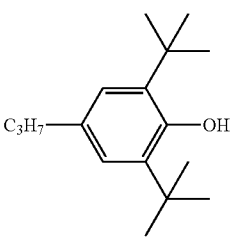
T-2-2
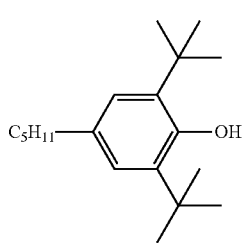
T-2-3
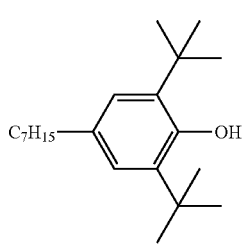
T-2-4
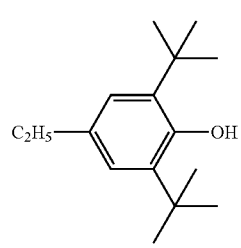
T-2-5
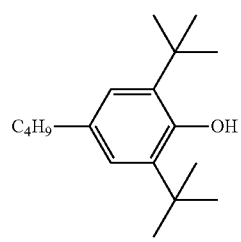
T-2-6
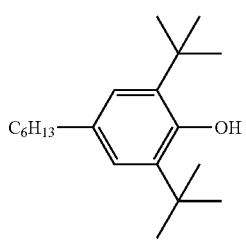

T-3-1 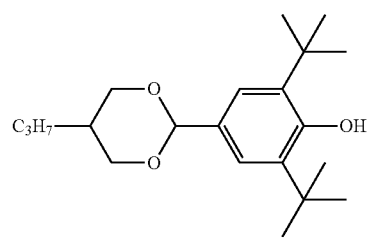
T-3-2 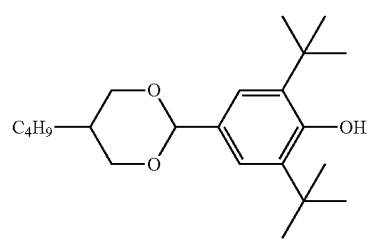
T-3-3 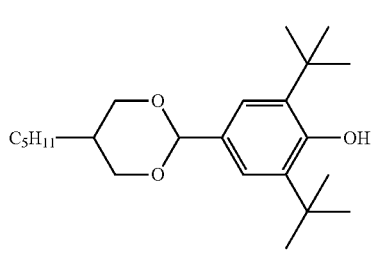
T-3-4 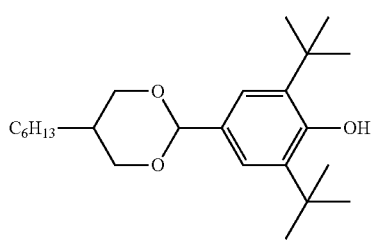
T-3-5 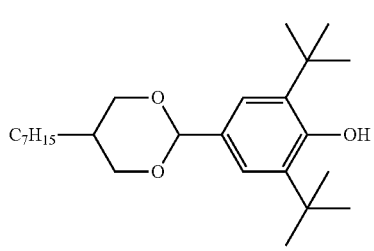
T-3-6 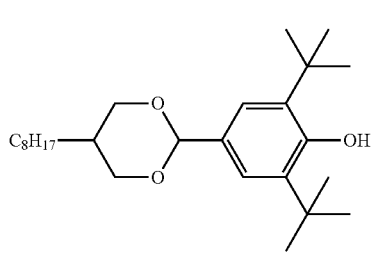
T-4-1 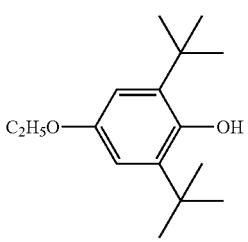
T-4-2 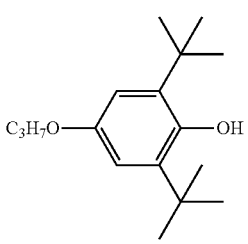
T-4-3 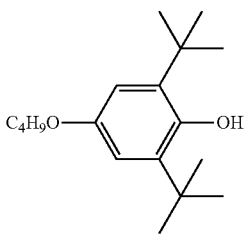
T-4-4 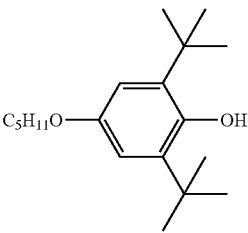
T-4-5 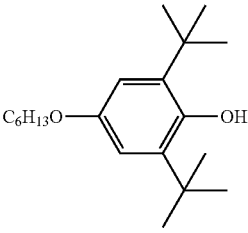
T-4-6 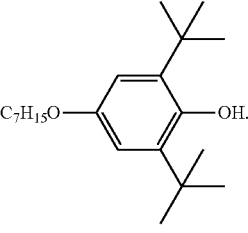
As for the liquid crystal composition of the present invention, preferably, the above-mentioned light stabilizer is selected from the group consisting of compounds represented by the following Formulas T-5 and/or T-6:

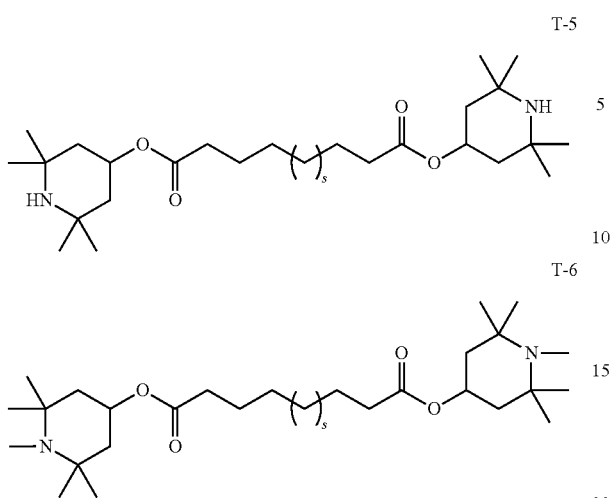

wherein

S represents an integer of 1-10.

[Liquid Crystal Display Element or Liquid Crystal Display]

The present invention further relates to a liquid crystal display element or liquid crystal display comprising any one of the above-mentioned liquid crystal compositions; and the display element or display is an active matrix display element or display.

The above-mentioned active matrix display element or display can be specifically exemplified by, for example, IPS-TFT or FFS-TFT or VA-TFT liquid crystal display elements or other TFT displays, especially liquid crystal display elements or liquid crystal displays in which FFS-TFT mode is applied.

The liquid crystal display element or liquid crystal display of the present invention comprises the liquid crystal composition disclosed in the present invention. The liquid crystal display element or liquid crystal display of the present invention is mainly applied to the fields of TV, MNT, NB, Mobile, industrial control and vehicles, medical panels, etc.

EXAMPLES

In order to explain the present invention more clearly, the present invention will be further explained below in conjunction with preferred examples. A person skilled in the art should understand that the following detailed description is illustrative rather than restrictive, and should not limit the scope of protection of the present invention.

In the present invention, the preparation methods are all conventional methods unless otherwise specified, the raw materials used can all be obtained from open commercial channels unless otherwise specified, the percentages all refer to mass percentages, the temperatures are degrees Celsius (° C.), and the specific meanings and test conditions of the other symbols are as follows:

Cp represents the clearing point (° C.) of a liquid crystal, as measured by DSC quantitative method;

Δn represents optical anisotropy, with Δn=ne−no, wherein no is the refractive index of ordinary light and ne is the refractive index of extraordinary light, and the test conditions are 25±2° C., 589 nm, and Abbe refractometer test;

V10 represents the voltage (V) at which the transmittance changes from 0% to 10% in the normally black mode and at which the transmittance changes from 100% to 90% in the normally white mode and the test conditions are 10±0.5° C. and 0±0.5° C., FFS cell and DMS test;

Δε represents dielectric anisotropy, $\Delta\varepsilon=\varepsilon_{//}-\varepsilon_{\perp}$, wherein $\varepsilon_{//}$ is the dielectric constant parallel to the molecular axis, and $\varepsilon_{\perp}$ is the dielectric constant perpendicular to the molecular axis, and the test conditions are 25±0.5° C., 20 μm antiparallel cell, and INSTEC:ALCT-IR1 test;

$\gamma_1$ represents rotational viscosity (mPa·s), and the test conditions are 25±0.5° C. and −20±0.5° C., 20 μm vertical cell, and INSTEC:ALCT-IR1 test;

$K_{11}$ is splay elastic constant, $K_{33}$ is bend elastic constant, and the test conditions are: 25±0.5° C., INSTEC:ALCT-IR1, and 20 μm antiparallel cell; and The preparation method for the liquid crystal composition involves: weighing various liquid crystal monomers at a certain ratio and putting the liquid crystal monomers into a stainless steel beaker, placing the stainless steel beaker containing these liquid crystal monomers on a magnetic stirring instrument for heating and melting, adding a magnetic rotor to the stainless steel beaker when most of the liquid crystal monomers in the stainless steel beaker have melted, uniformly stirring the mixture, and cooling the mixture to room temperature to obtain the liquid crystal composition.

The structures of the liquid crystal monomers in the examples of the present invention are represented by codes, and the code representation method for liquid crystal ring structures, terminal groups and linker groups is shown in Tables 1 and 2 below.

TABLE 1

| Corresponding codes of ring structures | |
|---|---|
| Ring structure | Corresponding code |
| (cyclohexane) | C |
| (cyclohexene) | L |
| (benzene) | P |
| (fluorobenzene) | G |
| (fluorobenzene) | Gi |
| (difluorobenzene) | Y |

TABLE 1-continued

| Corresponding codes of ring structures | |
|---|---|
| Ring structure | Corresponding code |
| 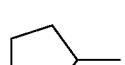 | B |
| 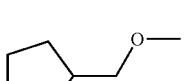 | Sb |
|  | Sc |

TABLE 2

| Corresponding codes of terminal groups and linker groups | |
|---|---|
| Terminal groups and linker groups | Corresponding code |
| $C_nH_{2n+1}-$ | n- |
| $C_nH_{2n+1}O-$ | nO— |
| $-CH_2O-$ | —O— |
| —F | —F |
| $-CH_2CH_2-$ | -E- |
| —CH=CH— | —V— |
| —COO— | —COO— |
| $-CH=CH-C_nH_{2n+1}$ | —Vn |
| 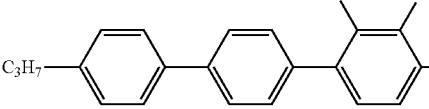 | Cp- |
| 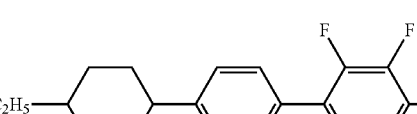 | CpO— |
| 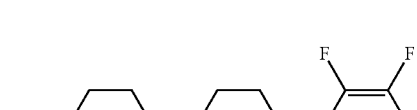 | Cpr- |
| 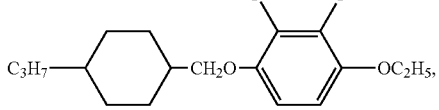 | Cpr1- |

For example:

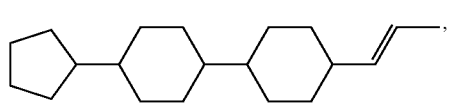 [SMILES: C/C=C/C1CCC(C2CCC(C3CCCC3)CC2)CC1]

the code of which is CC-Cp-V1;

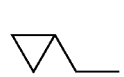

the code of which is PPY-3-O2;

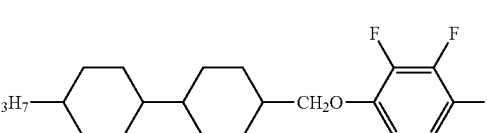

the code of which is CPY-2-O2;

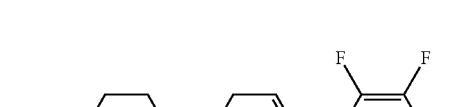

the code of which is CCY-3-O2;

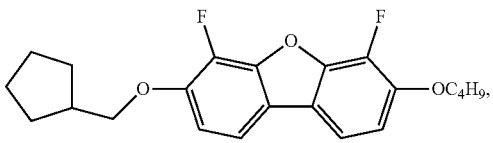

the code of which is COY-3-O2;

the code of which is CCOY-3-O2;

the code of which is CLY-3-O2;

the code of which is Sb—CpO—O4;

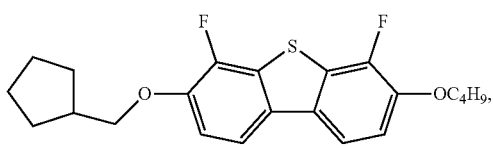

the code of which is Sc—CpO—O4;

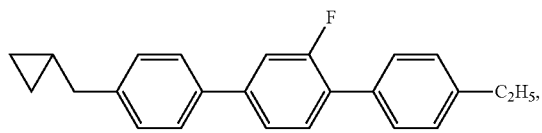

the code of which is PGP-Cpr1-2;

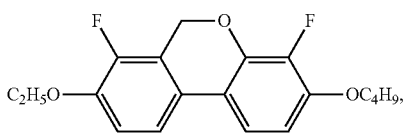

the code of which is B-2O—O4;

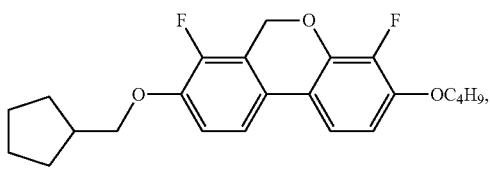

the code of which is B-CpO—O4

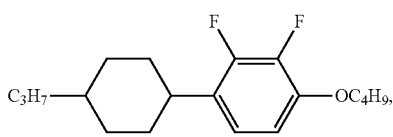

the code of which is CY-3-O2;

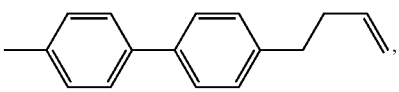 [SMILES: C=CCCc1ccc(-c2ccc(C)cc2)cc1]

the code of which is PP-1-2V.

The following specific examples are used to illustrate the present invention:

EXAMPLES

Example 1

TABLE 3

Formula and corresponding properties of the liquid crystal composition of Example 1

| Class | Code of liquid crystal monomer | Content (%) |
|---|---|---|
| I | CC-3-V | 32 |
| II | B-2O-O4 | 3 |
| II | B-5O-O2 | 5 |
| II | B-5O-O4 | 5 |
| III | PP-2-2V1 | 6 |
| IV | CPY-3-O2 | 8 |
| IV | CPY-2-O2 | 9 |
| IV | CCY-3-O2 | 5 |
| IV | CLY-3-O2 | 4 |
| V | CY-3-O2 | 15 |
| VII | PPY-5-O2 | 3 |
| VIII | PYP-2-3 | 5 |
| Properties | Cp: 76.1° C. | |
| | $\Delta n$: 0.127 | |
| | $\Delta \varepsilon$: −3.9 | |
| | $\gamma_1$: 85.2 mPa · s | |
| | $K_{11}$: 14.8 | |
| | $K_{33}$: 14.3 | |

Example 2

TABLE 4

Formula and corresponding properties of the liquid crystal composition of Example 2

| Class | Code of liquid crystal monomer | Content (%) |
|---|---|---|
| I | CC-3-V | 35 |
| II | B-5O-O2 | 5 |
| III | PP-1-2V1 | 3 |
| IV | CPY-3-O2 | 8 |
| IV | CCY-2-O2 | 8 |
| IV | CLY-3-O2 | 7 |
| IV | CLY-2-O4 | 7 |
| V | COY-3-O2 | 5 |
| V | PY-1-O2 | 10 |
| VI | CC-3-V1 | 5 |
| VII | PPY-3-O2 | 2 |
| IX | Sc-CpO-O2 | 5 |
| Properties | Cp: 74.8° C. | |
| | $\Delta n$: 0.113 | |
| | $\Delta \varepsilon$: −4.5 | |
| | $\gamma_1$: 76 mPa · s | |
| | $K_{11}$: 14.6 | |
| | $K_{33}$: 14.7 | |

Example 3

TABLE 5

Formula and corresponding properties of the liquid crystal composition of Example 3

| Class | Code of liquid crystal monomer | Content (%) |
|---|---|---|
| I | CC-3-V | 42 |
| II | B-2O-O5 | 3 |

TABLE 5-continued

Formula and corresponding properties of the liquid crystal composition of Example 3

| Class | Code of liquid crystal monomer | Content (%) |
|---|---|---|
| III | PP-1-2V1 | 5 |
| IV | CPY-3-O2 | 8 |
| IV | CPY-5-O2 | 3 |
| IV | CCY-3-O2 | 5 |
| IV | CCY-3-O1 | 3 |
| V | PY-3-O2 | 11 |
| VI | CCP-3-1 | 4 |
| VI | CPP-1V-2 | 4 |
| VI | CC-3-V1 | 5 |
| IX | Sc-CpO-O4 | 7 |
| Properties | Cp: 73.3° C. $\Delta$n: 0.107 $\Delta\varepsilon$: −2.3 $\gamma_1$: 45 mPa · s $K_{11}$: 14.4 $K_{33}$: 15.0 | |

Example 4

TABLE 6

Formula and corresponding properties of the liquid crystal composition of Example 4

| Class | Code of liquid crystal monomer | Content (%) |
|---|---|---|
| I | CC-3-V | 36 |
| II | B-4O-O2 | 2 |
| II | B-2O-O5 | 5 |
| III | PP-2-2V | 3 |
| IV | CPY-3-O2 | 6 |
| IV | CPY-3-O4 | 4 |
| IV | CCY-2-O2 | 4 |
| IV | CCY-3-O2 | 4 |
| IV | CLY-3-O2 | 5 |
| IV | CLY-3-O3 | 3 |
| IV | CLY-2-O4 | 4 |
| V | CY-3-O2 | 5 |
| V | COY-3-O2 | 10 |
| VI | CC-3-V1 | 3 |
| VII | PGiY-3-O2 | 2 |
| VII | PPY-3-O4 | 1 |
| VIII | PYP-2-3 | 3 |
| Properties | Cp: 77.9° C. $\Delta$n: 0.107 $\Delta\varepsilon$: −4.0 $\gamma_1$: 74.9 mPa · s $K_{11}$: 14.4 $K_{33}$: 15.8 | |

Example 5

TABLE 7

Formula and corresponding properties of the liquid crystal composition of Example 5

| Class | Code of liquid crystal monomer | Content (%) |
|---|---|---|
| I | CC-3-V | 33 |
| II | B-2O-O5 | 5 |
| II | B-5O-O2 | 5 |
| III | PP-1-2V | 3 |
| IV | CPY-3-O2 | 10 |
| IV | CCY-2-O2 | 10 |
| IV | CCEY-3-O2 | 7 |
| IV | CLY-4-O2 | 4 |

TABLE 7-continued

Formula and corresponding properties of the liquid crystal composition of Example 5

| Class | Code of liquid crystal monomer | Content (%) |
|---|---|---|
| IV | CLY-2-O4 | 5 |
| V | PY-3-O2 | 8 |
| V | CY-3-O2 | 10 |
| Properties | Cp: 80.1° C. $\Delta$n: 0.111 $\Delta\varepsilon$: −4.7 $\gamma_1$: 91.8 mPa · s $K_{11}$: 15.3 $K_{33}$: 15.6 | |

Example 6

TABLE 8

Formula and corresponding properties of the liquid crystal composition of Example 6

| Class | Code of liquid crystal monomer | Content (%) |
|---|---|---|
| I | CC-3-V | 30 |
| II | B-3O-O4 | 4 |
| III | PP-1-2V1 | 5 |
| III | PP-1-2V | 5 |
| IV | CPY-3-O2 | 12 |
| IV | CCY-2-O2 | 3 |
| IV | CCY-3-O2 | 10 |
| IV | CLY-3-O2 | 1 |
| IV | CCOY-3-O2 | 5 |
| IV | CCOY-2-O2 | 5 |
| V | COY-3-O2 | 11 |
| VI | CC-2-3 | 3 |
| VI | CC-3-V1 | 5 |
| VII | PPY-3-O2 | 1 |
| Properties | Cp: 75.2° C. $\Delta$n: 0.104 $\Delta\varepsilon$: −4.1 $\gamma_1$: 79.3 mPa · s $K_{11}$: 15.2 $K_{33}$: 15.9 | |

Example 7

TABLE 9

Formula and corresponding properties of the liquid crystal composition of Example 7

| Class | Code of liquid crystal monomer | Content (%) |
|---|---|---|
| I | CC-3-V | 40 |
| II | B-2O-O5 | 5 |
| II | B-3O-O5 | 5 |
| II | B-4O-O5 | 5 |
| III | PP-1-2V1 | 8 |
| III | PP-3-2V1 | 4 |
| IV | CPY-3-O2 | 9 |
| IV | CLY-4-O2 | 5 |
| IV | CLY-3-O2 | 7 |
| IV | CLY-2-O4 | 6 |
| V | COY-3-O2 | 6 |
| Properties | Cp: 75.0° C. $\Delta$n: 0.110 $\Delta\varepsilon$: −3.8 $\gamma_1$: 65.4 mPa · s $K_{11}$: 15.4 $K_{33}$: 14.2 | |

Example 8

TABLE 10

Formula and corresponding properties of the liquid crystal composition of Example 8

| Class | Code of liquid crystal monomer | Content (%) |
|---|---|---|
| I | CC-3-V | 48 |
| II | B-5O-O2 | 6 |
| IX | Sc-CpO-O4 | 5 |
| IX | Sc-CpO-O2 | 5 |
| III | PP-3-2V | 2 |
| IV | CPY-3-O2 | 9 |
| IV | CLY-4-O2 | 4 |
| IV | CLY-3-O2 | 7 |
| IV | CLY-2-O4 | 4 |
| V | PY-2-O2 | 8 |
| VII | PGiY-2-O4 | 2 |
| Properties | Cp: 75.0° C. | |
| | $\Delta n$: 0.110 | |
| | $\Delta \varepsilon$: −3.7 | |
| | $\gamma_1$: 63.5 mPa · s | |
| | $K_{11}$: 14.8 | |
| | $K_{33}$: 13.5 | |

Example 9

TABLE 11

Formula and corresponding properties of the liquid crystal composition of Example 9

| Class | Code of liquid crystal monomer | Content (%) |
|---|---|---|
| I | CC-3-V | 37 |
| II | B-5O-O2 | 6 |
| III | PP-1-2V1 | 10 |
| IV | CPY-3-O2 | 9 |
| IV | CPY-4-O2 | 4 |
| IV | CPY-3-O4 | 4 |
| IV | CLY-3-O2 | 8 |
| V | PY-2O-O2 | 6 |
| V | PY-1-O2 | 9 |
| | CPPC-3-3 | 2 |
| VII | PPY-3-O2 | 2 |
| IX | Sc-CpO-O4 | 3 |
| Properties | Cp: 74.0° C. | |
| | $\Delta n$: 0.130 | |
| | $\Delta \varepsilon$: −3.4 | |
| | $\gamma_1$: 70.0 mPa · s | |
| | $K_{11}$: 15.1 | |
| | $K_{33}$: 15.9 | |

Example 10

TABLE 12

Formula and corresponding properties of the liquid crystal composition of Example 10

| Class | Code of liquid crystal monomer | Content (%) |
|---|---|---|
| I | CC-3-V | 41 |
| II | B-5O-O2 | 6 |
| III | PP-1-2V1 | 10 |
| V | CY-3-O2 | 6 |
| V | PY-2O-O2 | 6 |
| V | PY-1-O2 | 9 |
| | CPPC-3-3 | 2 |
| VII | PPY-3-O2 | 2 |
| IX | Sc-CpO-O4 | 3 |

TABLE 12-continued

Formula and corresponding properties of the liquid crystal composition of Example 10

| Class | Code of liquid crystal monomer | Content (%) |
|---|---|---|
| IX | Sc-2O-O4 | 8 |
| IX | Sb-2O-O5 | 7 |
| Properties | Cp: 74.2° C. | |
| | $\Delta n$: 0.131 | |
| | $\Delta \varepsilon$: −3.4 | |
| | $\gamma_1$: 71.2 mPa · s | |
| | $K_{11}$: 15.3 | |
| | $K_{33}$: 16.1 | |

Example 11

TABLE 13

Formula and corresponding properties of the liquid crystal composition of Example 11

| Class | Code of liquid crystal monomer | Content (%) |
|---|---|---|
| I | CC-3-V | 41 |
| II | B-5O-O2 | 6 |
| III | PP-1-2V1 | 5 |
| V | CY-3-O2 | 6 |
| V | PY-2O-O2 | 6 |
| V | PY-1-O2 | 9 |
| | CPPC-3-3 | 2 |
| VII | PPY-3-O2 | 2 |
| IX | Sc-CpO-O4 | 3 |
| IX | Sc-2O-O4 | 8 |
| IX | Sb-2O-O5 | 7 |
| | PP-1-3 | 5 |
| Properties | Cp: 74.1° C. | |
| | $\Delta n$: 0.131 | |
| | $\Delta \varepsilon$: −3.4 | |
| | $\gamma_1$: 71.2 mPa · s | |
| | $K_{11}$: 15.3 | |
| | $K_{33}$: 16.1 | |

Example 12

TABLE 14

Formula and corresponding properties of the liquid crystal composition of Example 12

| Class | Code of liquid crystal monomer | Content (%) |
|---|---|---|
| I | CC-3-V | 37 |
| II | B-5O-O2 | 6 |
| III | PP-1-2V1 | 10 |
| V | CY-3-O2 | 6 |
| V | PY-2O-O2 | 6 |
| V | PY-1-O2 | 9 |
| VI | CC-3-V1 | 4 |
| | CPPC-3-3 | 2 |
| VII | PPY-3-O2 | 2 |
| IX | Sc-CpO-O4 | 3 |
| IX | Sc-2O-O4 | 8 |
| IX | Sb-2O-O5 | 7 |
| Properties | Cp: 74.0° C. | |
| | $\Delta n$: 0.130 | |
| | $\Delta \varepsilon$: −3.4 | |
| | $\gamma_1$: 71.2 mPa · s | |
| | $K_{11}$: 15.2 | |
| | $K_{33}$: 16.1 | |

Comparative Example 1

TABLE 15

Formula and corresponding properties of the liquid crystal composition of Comparative Example 1

| Class | Code of liquid crystal monomer | Content (%) |
|---|---|---|
| I | CC-3-V | 34 |
| IX | Sc-CpO-O4 | 5 |
| IX | Sb-CpO-O4 | 4 |
|  | PP-1-3 | 3 |
| IV | CPY-3-O2 | 10 |
| IV | CCY-2-O2 | 10 |
| IV | CCEY-3-O2 | 7 |
| IV | CLY-4-O2 | 4 |
| IV | CLY-2-O4 | 5 |
| V | PY-3-O2 | 8 |
| V | CY-3-O2 | 10 |
| Properties | Cp: 78.8° C. $\Delta$n: 0.110 $\Delta\varepsilon$: −4.7 $\gamma_1$: 90.5 mPa · s $K_{11}$: 14.7 $K_{33}$: 15.1 | |

Comparative Example 2

TABLE 16

Formula and corresponding properties of the liquid crystal composition of Comparative Example 2

| Class | Code of liquid crystal monomer | Content (%) |
|---|---|---|
| I | CC-3-V | 34 |
| II | B-5O-O2 | 3 |
| IX | Sc-CpO-O4 | 6 |
|  | PP-1-5 | 10 |
| IV | CPY-3-O2 | 9 |
| IV | CPY-4-O2 | 4 |
| IV | CPY-3-O4 | 4 |
| IV | CLY-3-O2 | 8 |
| V | PY-2O-O2 | 6 |
| V | PY-1-O2 | 9 |
| VI | CCP-V-1 | 3 |
| VI | CPPC-3-3 | 2 |
| VII | PPY-3-O2 | 2 |
| Properties | Cp: 74.0° C. $\Delta$n: 0.130 $\Delta\varepsilon$: −3.4 $\gamma_1$: 74.1 mPa · s $K_{11}$: 14.9 $K_{33}$: 15.4 | |

Comparative Example 3

TABLE 17

Formula and corresponding properties of the liquid crystal composition of Comparative Example 3

| Class | Code of liquid crystal monomer | Content (%) |
|---|---|---|
| I | CC-3-V | 46 |
| IX | Sb-CpO-O4 | 5 |
| IX | Sc-CpO-O4 | 6 |
| IX | Sc-CpO-O2 | 5 |
|  | PP-2-5 | 2 |
| IV | CPY-3-O2 | 9 |
| IV | CLY-4-O2 | 4 |
| IV | CLY-3-O2 | 7 |

TABLE 17-continued

Formula and corresponding properties of the liquid crystal composition of Comparative Example 3

| Class | Code of liquid crystal monomer | Content (%) |
|---|---|---|
| IV | CLY-2-O4 | 4 |
| V | PY-2-O2 | 8 |
| VI | CCP-V-1 | 2 |
| VII | PGiY-2-O4 | 2 |
| Properties | Cp: 75.0° C. $\Delta$n: 0.110 $\Delta\varepsilon$: −3.7 $\gamma_1$: 65.8 mPa · s $K_{11}$: 14.9 $K_{33}$: 13.5 | |

Comparative Example 4

TABLE 18

Formula and corresponding properties of the liquid crystal composition of Comparative Example 4

| Class | Code of liquid crystal monomer | Content (%) |
|---|---|---|
| I | CC-3-V | 25 |
| II | B-2O-O4 | 3 |
| II | B-5O-O2 | 5 |
| II | B-5O-O4 | 5 |
|  | PP-2-3 | 6 |
| IV | CPY-3-O2 | 8 |
| IV | CPY-2-O2 | 9 |
| IV | CCY-3-O2 | 5 |
| IV | CLY-3-O2 | 4 |
| V | CY-3-O2 | 15 |
| VI | CC-3-V1 | 7 |
| VII | PPY-5-O2 | 3 |
| VIII | PYP-2-3 | 5 |
| Properties | Cp: 75.8° C. $\Delta$n: 0.127 $\Delta\varepsilon$: −3.9 $\gamma_1$: 88.5 mPa · s $K_{11}$: 14.7 $K_{33}$: 14.4 | |

Frequency Dependence Experiment:

Samples of Examples 1 to 12 and Comparative Examples 1 to 4 were respectively taken and poured into 3.2 μm FFS test cells and tested for V10 under 128 Hz and 10000 Hz conditions at 10° C. and 0° C.

Voltage change rate=V10(10000 Hz)/V10(128 Hz)

The smaller the value of the V10 voltage change rate, the better the frequency dependence. The specific data were as shown in Tables 19 and 20. Compared with the comparative examples, the examples in which the liquid crystal composition of the present invention was used had better frequency dependence.

TABLE 19

Voltage change rate data at 10° C.

| Condition | V 10 (10000 Hz) | V 10 (128 Hz) | Voltage change rate (%) |
|---|---|---|---|
| Example 1 | 2.58 | 2.50 | 1.030 |
| Example 2 | 2.42 | 2.34 | 1.033 |
| Example 3 | 3.16 | 3.10 | 1.020 |
| Example 4 | 2.51 | 2.50 | 1.003 |
| Example 5 | 2.39 | 2.36 | 1.012 |
| Example 6 | 2.51 | 2.47 | 1.017 |

TABLE 19-continued

Voltage change rate data at 10° C.

| Condition | V 10 (10000 Hz) | V 10 (128 Hz) | Voltage change rate (%) |
|---|---|---|---|
| Example 7 | 2.61 | 2.56 | 1.019 |
| Example 8 | 2.59 | 2.54 | 1.020 |
| Example 9 | 2.75 | 2.68 | 1.027 |
| Example 10 | 2.82 | 2.73 | 1.033 |
| Example 11 | 2.77 | 2.68 | 1.034 |
| Example 12 | 2.86 | 2.77 | 1.032 |
| Comparative Example 1 | 2.34 | 2.26 | 1.035 |
| Comparative Example 2 | 2.74 | 2.63 | 1.041 |
| Comparative Example 3 | 2.68 | 2.56 | 1.049 |
| Comparative Example 4 | 2.57 | 2.48 | 1.038 |

TABLE 20

Voltage change rate data at 0° C.

| Condition | V 10 (10000 Hz) | V 10 (128 Hz) | Voltage change rate (%) |
|---|---|---|---|
| Example 1 | 2.64 | 2.50 | 1.056 |
| Example 2 | 2.48 | 2.34 | 1.059 |
| Example 3 | 3.24 | 3.10 | 1.045 |
| Example 4 | 2.57 | 2.50 | 1.028 |
| Example 5 | 2.45 | 2.36 | 1.037 |
| Example 6 | 2.57 | 2.47 | 1.042 |
| Example 7 | 2.67 | 2.56 | 1.044 |
| Example 8 | 2.66 | 2.54 | 1.046 |
| Example 9 | 2.82 | 2.68 | 1.053 |
| Example 10 | 2.89 | 2.73 | 1.059 |
| Example 11 | 2.84 | 2.68 | 1.060 |
| Example 12 | 2.91 | 2.75 | 1.058 |
| Comparative Example 1 | 2.40 | 2.26 | 1.061 |
| Comparative Example 2 | 2.81 | 2.63 | 1.067 |
| Comparative Example 3 | 2.75 | 2.56 | 1.075 |
| Comparative Example 4 | 2.64 | 2.48 | 1.064 |

The above examples of the present invention are only to clearly illustrate the instances of the present invention, rather than defining the embodiments of the present invention. For those of ordinary skill in the art, other different forms of changes or variations can also be made on the basis of the above description. It is impossible to exhaustively list all the embodiments here, and all obvious changes or variations that are derived from the technical solution of the present invention are still within the scope of protection of the present invention.

The invention claimed is:

1. A liquid crystal composition with good frequency dependence, comprising a compound represented by Formula I, wherein the mass percentage content of the compound represented by Formula I in the liquid crystal composition is not less than 30%; and the liquid crystal composition further comprises one or more compounds represented by Formula II and one or more compounds represented by Formula III-A, III-B, and at least three compounds represented by Formula IV,

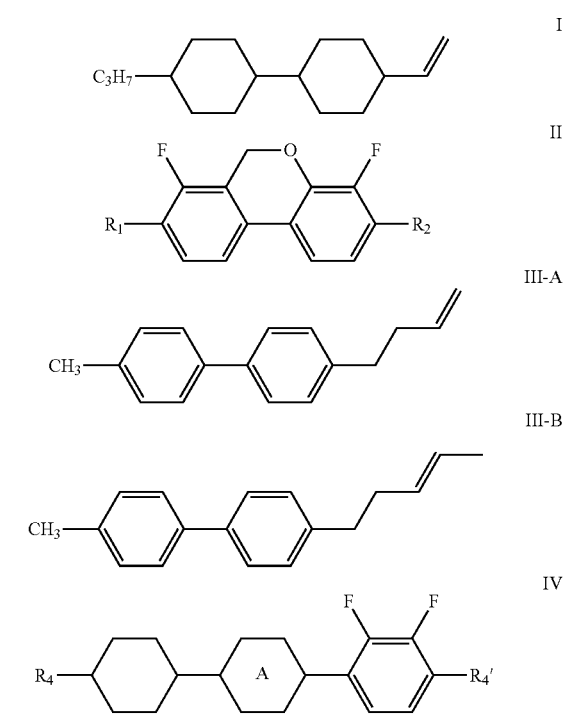

wherein in Formula II, $R_1$ and $R_2$ each independently represent an alkoxy with a carbon atom number of 1-10 or an alkenoxy with a carbon atom number of 2-10; and when $R_1$ and $R_2$ each independently represent an alkoxy with a carbon atom number of 2-10 or an alkenoxy with a carbon atom number of 2-10, any one of the hydrogen atoms thereof can be replaced by F; and in Formula IV, $R_4$ represents an alkyl with a carbon atom number of 1-10 or an alkenyl with a carbon atom number of 2-10;

$R_4'$ represents an alkyl with a carbon atom number of 1-10 or an alkoxy with a carbon atom number of 1-10; and

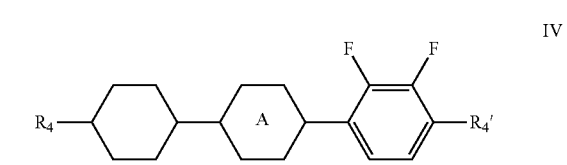

represents

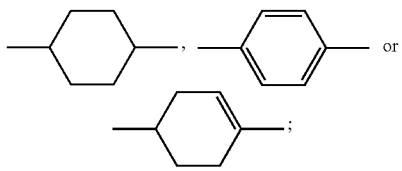

the mass content of the compound represented by Formula II is 3-15%; and the mass percentage content of the compound represented by Formula III-A, III-B is 2-10%.

2. The liquid crystal composition according to claim 1, wherein the liquid crystal composition comprises one or more compounds represented by Formula V:

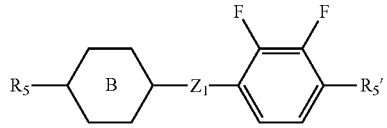
V wherein in Formula V, $R_5$ represents an alkyl with a carbon atom number of 1-10 or an alkenyl with a carbon atom number of 2-10;

$R_5'$ represents an alkyl with a carbon atom number of 1-10 or an alkoxy with a carbon atom number of 1-10; and

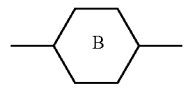

represents

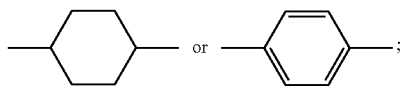

and $Z_1$ represents a single bond, —CH$_2$O— or —CH$_2$CH$_2$—.

3. The liquid crystal composition according to claim 1, wherein the compound represented by Formula II in the liquid crystal composition is selected from the group consisting of compounds represented by Formulas II-A, II-B, II-C, II-D, II-E, II-F, II-G, II-H, and II-I:

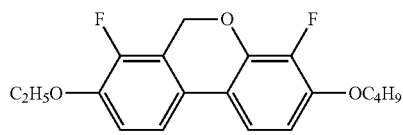
II-A

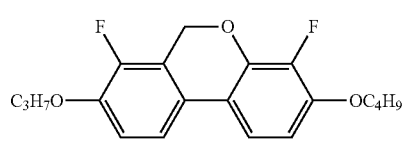
II-B

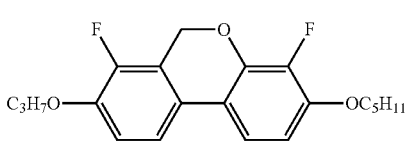
II-C

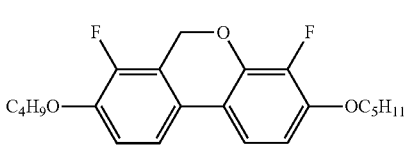
II-D

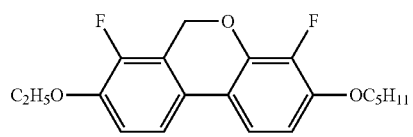
II-E

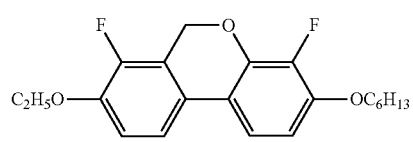
II-F

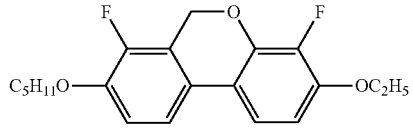
II-G

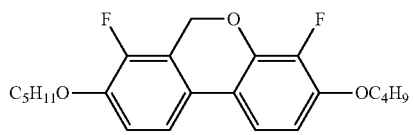
II-H

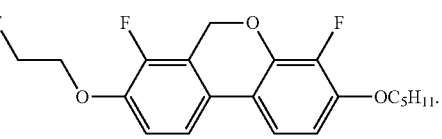
II-I.

4. The liquid crystal composition according to claim 1, wherein the liquid crystal composition further comprises one or more compounds represented by Formula IV other than those represented by Formula I:

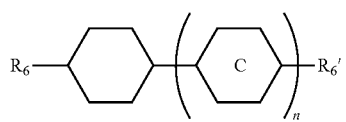
VI wherein in Formula VI, $R_6$ and $R_6'$ each independently represent an alkyl with a carbon atom number of 1-10, an alkoxy with a carbon atom number of 1-10 or an alkenyl with a carbon atom number of 2-10;

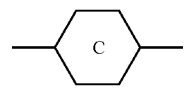

represents

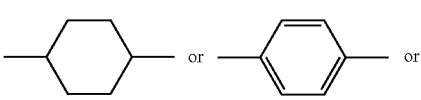

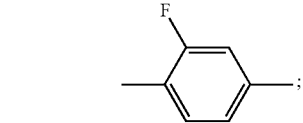

and
n represents 1 or 2 or 3; and when n represents 2 or 3, two or three

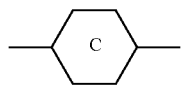

may be the same or different.

5. The liquid crystal composition according to claim 1, wherein the liquid crystal composition further comprises one or more compounds represented by Formula VII and/or one or more compounds represented by Formula VIII:

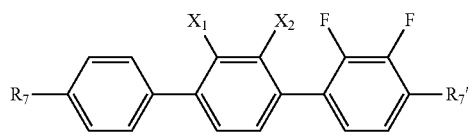  VII

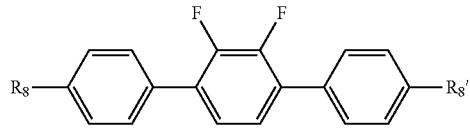  VIII wherein $R_7$, $R_7'$, $R_8$ and $R_8'$ each independently represent an alkyl with a carbon atom number of 1-10 and an alkoxy with a carbon atom number of 1-10; and $X_1$ and $X_2$ each independently represent H or F.

6. A liquid crystal display element or a liquid crystal display, characterized by comprising the liquid crystal composition according to claim 1, wherein the liquid crystal display element or liquid crystal display is an active matrix addressing display element or display or a passive matrix addressing display element or display.

* * * * *